(12) United States Patent
Al-Hassanieh et al.

(10) Patent No.: US 9,268,025 B2
(45) Date of Patent: Feb. 23, 2016

(54) FAST TRANSFORM BASED OFFSET DETERMINATION

(75) Inventors: Haitham Zuhair Al-Hassanieh, Cambridge, MA (US); Fadel Adib, Cambridge, MA (US); Dina Katabi, Cambridge, MA (US); Piotr Indyk, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 641 days.

(21) Appl. No.: 13/570,771

(22) Filed: Aug. 9, 2012

(65) Prior Publication Data

US 2014/0062779 A1 Mar. 6, 2014

(51) Int. Cl.
*G01S 19/30* (2010.01)
*G01S 19/37* (2010.01)
*H04B 1/709* (2011.01)
*H04B 1/7105* (2011.01)
*H04N 19/60* (2014.01)

(52) U.S. Cl.
CPC ............... *G01S 19/30* (2013.01); *G01S 19/37* (2013.01); *H04B 1/709* (2013.01); *H04B 1/71052* (2013.01); *H04N 19/60* (2013.01)

(58) Field of Classification Search
CPC ........... G01S 19/37; G01S 19/30; H04B 1/69; H04B 1/707; H04B 1/709
USPC ................................................. 375/149, 150
See application file for complete search history.

(56) References Cited

U.S. PATENT DOCUMENTS

| 5,329,318 | A  | * | 7/1994  | Keith           | 348/699    |
|-----------|----|---|---------|-----------------|------------|
| 5,850,485 | A  | * | 12/1998 | Hart            | 382/278    |
| 2003/0154025 | A1 | * | 8/2003  | Fuchs et al.    | 701/213    |
| 2006/0082496 | A1 | * | 4/2006  | Winternitz et al. | 342/357.06 |
| 2006/0222056 | A1 | * | 10/2006 | Yotsumoto et al. | 375/149    |
| 2007/0211792 | A1 | * | 9/2007  | Chen            | 375/149    |
| 2008/0075372 | A1 | * | 3/2008  | Stentiford      | 382/218    |
| 2008/0191932 | A1 | * | 8/2008  | Hemming et al.  | 342/196    |

OTHER PUBLICATIONS

Donoho, D. "For Most Large Underdetermined Systems of Linear Equations the Minimal l1-norm Solution is also the Sparsest Solution," Sep. 16, 2004, pp. 1-28, Dept. of Statistics, Stanford University.*

Misra et al. "Efficient Cross-Correlation Via Sparse Representation in Sensor Networks," IPSN'12 Apr. 2012, pp. 1-28.*

(Continued)

*Primary Examiner* — Gregory C Issing
(74) *Attorney, Agent, or Firm* — Occhiuti & Rohlicek LLP

(57) ABSTRACT

An offset estimator (e.g., a time delay, a spatial image offset, etc.) makes use of a transform approach (e.g., using Fast Fourier Transforms). The sparse nature of a cross-correlation is exploited by limiting the computation required in either or both of the forward and inverse transforms. For example, only a subset of the transform values (e.g., a regular subsampling of the values) is used. In some examples, an inverse transform yields a time aliased version of the cross-correlation. Further processing then identifies the most likely offset of the original signals by considering offsets that are consistent with the aliased output.

12 Claims, 1 Drawing Sheet

(56) References Cited

OTHER PUBLICATIONS

Wright et al, "Robust Face Recognition via Sparse Represnetation," IEEE Trans on Pattern Analysis and Machine Intelligence, vol. 31, No. 2, Feb. 2009, pp. 1-18.*

Zou, J. "A Sublinear Algorithm for the Recovery of Signals With Sparse Fourier Transform When Many Samples Are Missing," Applied and Computational Harmonic Analysis vol. 22, Issue 1, Jan. 2007, pp. 61-77.*

* cited by examiner

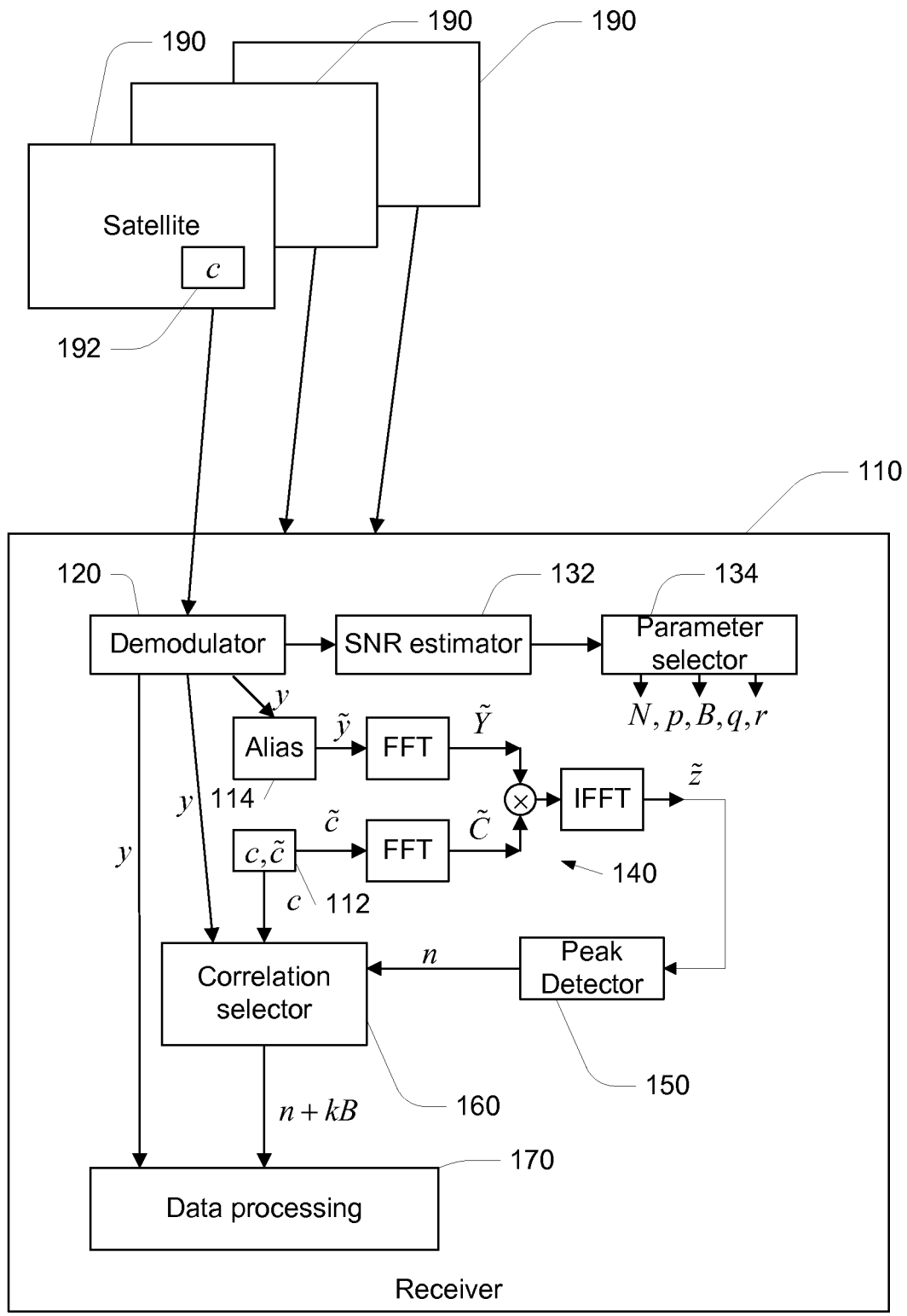

FAST TRANSFORM BASED OFFSET DETERMINATION

STATEMENT AS TO FEDERALLY SPONSORED RESEARCH

This invention was made with government support under contract FA9550-08-1-0159 awarded by the Air Force Office of Scientific Research (AFOSR). The government has certain rights in the invention.

CROSS-REFERENCE TO RELATED APPLICATIONS

This application is related to U.S. Provisional Application No. 61/681,328, filed Aug. 9, 2012, which is incorporated herein by reference.

BACKGROUND

This invention relates to fast transform based offset determination.

In a number of applications, it is necessary to estimate an offset, for example a time delay, between a two signals, $x=(x_0, \ldots, x_{N-1})$ and $y=(y_0, \ldots, y_{N-1})$, which may represent two noisy instances of a common signal with different delays. A well-known approach to determining the relative delay of the signals is to form a cross-correlation of the signals as the convolution of time-reversed version of one of the signals $x_{-N}=(x_{N-1}, \ldots, x_0)$ and the other signal to find $z=x_{-N} \otimes y=(z_0, \ldots, z_{N-1})$ and determine the index i of the value $z_i$ that is largest. It is also well known that the signal z can be determined using a Fourier Transform approach as $z = \mathcal{F}^{-1}(\mathcal{F}(x) * \mathcal{F}(y))$ where $\mathcal{F}()$ is the N point Discrete Fourier Transform (DFT), recognizing that the DFT approach computes a circular convolution, and therefore the signals x and y should be suitably padded with zeros.

Although presented above with a one-dimensional signal, essentially the same approach may be used for multidimensional data (e.g., images) in which an offset for each dimension is determined.

One application in which such delays are computed in a Global Positioning System (GPS) receiver, in which the signals represent a pseudo-noise reference signal and a reception of the same pseudo-noise signal transmitted from a satellite.

There is a need to reduce the computation required to determine a time offset, for example, to reduce the computation resources (e.g., processor speed, power, time) needed to implement the computation.

SUMMARY

In one general aspect, an approach to determining an offset estimate (e.g., a time delay, a spatial image offset, etc.) makes use of the recognition that the cross-correlation between the two signals is substantially sparse (i.e., compact), with a peak at the true offset value. One such approach that makes use of a transform approach (e.g., using Fast Fourier Transforms). The sparse nature of the cross-correlation is exploited by limiting the computation required in either or both of the forward and inverse transforms. In some examples, only a subset of the transform values (e.g., a regular subsampling of the values) is used. In some examples of using a subset of the transform values, the input signals are aliased thereby requiring fewer samples to be processed to determine the regular samples, of the transforms of the inputs signals. In some examples of using the subset of transform values, an inverse transform yields a time aliased version of the cross-correlation. In some examples, the time-aliases version of the cross-correlation is further processed to identify the most likely offset of the original signals by considering offsets that are consistent with the aliased output.

Although described above in the content of computing a cross-correlation, it should be recognized that the same approach may be used in other situation in which a convolution of signals yields a sparse output, thereby permitting computation in the transform domain to restrict calculation to a limited subset of transform values.

In one aspect, in general, a method for determining a relative offset estimate between a first signal and a second signal includes acquiring at least one of the first signal and the second signal. For each of the first signal and the second signal, determining a subset of transform coefficients of said signal. The subsets of the transform coefficients are combined to determine a subset of transform coefficients of a correlation signal. An inverse transform is then performed of the subset of the transform coefficients of the correlation signal yielding a modified correlation signal. A set of two of more relative offsets consistent with the modified correlation signal are then determined from the modified correlation signal. The relative offset estimate is then determined by performing a correlation computation using the first and the second signals at multiple of the two of more relative offsets. A data signal representing the relative offset estimate is then provided.

In some examples, the approach is applied in a positioning system in which acquiring the at least one of the first signal and the second signal comprises receiving and demodulating a radio positioning system signal to yield the second signal at a receiver.

In some examples, the approach is applied in a video processing system in which acquiring the at least one of the first signal and the second signal comprises receiving a first video frame and second video frame wherein the first signal and the second signal represent portions of the first video frame and the second video frame, respectively.

Advantages of one or more aspects include reducing GPS locking complexity to $O(N\sqrt{\log N})$. Further, if the signal-to-noise ratio (SNR) is above a threshold, the algorithm becomes linear, i.e., $O(N)$. This gain translates into empirical gains for GPS receivers. In at least one implementation of a GPS receiver on two GPS datasets, the approach reduces the median number of multiplications by 2.2× in comparison to the state of the art design, for real GPS signals Other features and advantages of the invention are apparent from the following description, and from the claims.

DESCRIPTION OF DRAWINGS

FIG. 1 is a block diagram showing a positioning system receiver.

DESCRIPTION

A general approach to estimating relative delay between two signals is first presented below, followed by exposition of an application for reducing the computational complexity of a GPS receiver. A number of specific improvements, for example, related variants for high or for low SNR, and to accommodate Doppler shift in GPS applications, are then presented.

As introduced above, to estimate the relative delay between two N point signals x and y, for example N complex time samples of a signals repeating every N samples, an N point circular cross-correlation can be computed in the time domain as a convolution $z = x_{-N} \otimes y = (z_0, \ldots, z_{N-1})$ and the index i of the value $z_i$ that is largest is used as the estimate of the relative delay. If all N possible delays are computed in this manner in the original signal domain, the computation required is $O(N^2)$.

It is also well known that the signal z can be determined using a Fourier Transform approach as $z = \mathcal{F}^{-1}(\mathcal{F}(x) * \mathcal{F}(y))$ where $\mathcal{F}()$ is the N point Discrete Fourier Transform, defined as $X = (X_0, \ldots, X_{N-1}) = \mathcal{F}((x_0, \ldots, x_{N-1}))$ where $$X_k = \sum_{n=0}^{N-1} x_n e^{-j(2\pi k/N)n}.$$

Using a Fast Fourier Transform to implement the forward and inverse transforms, the computation required is $O(N \log N)$.

A property of the Fourier transform is that subsampling in one domain corresponds to aliasing in the other domain. For example, if a length B aliased time signal $\tilde{x} = (\tilde{x}_0, \ldots, \tilde{x}_{B-1})$ is defined as $$\tilde{x}_n = \sum_{j=0}^{(N/B)-1} x_{n+jB},$$

then the B transform values are related to the transform values of X as $$\tilde{X}_k = X_{pk}$$

where $p = N/B$, which is referred to as the aliasing factor below.

Therefore, in the context of computing the peak of the cross-correlation z, if the p subsampled values $Z_{pk}$ are known, then a time aliased signal $\tilde{z}$ is obtained by inverse transform of $\tilde{Z}$. Because the length of the transform is reduced by a factor of p, a full Fast Fourier Transform computation requiring $O(N \log N)$ computation is reduced to $O((N/p)\log(N/p))$, or by more than a factor of p.

Note that a peak at sample $\tilde{z}_n$ may correspond to a peak at any of samples $z_{n+kB}$ for p possible values of k. This sample value n may be considered to be a hash value of the true offset value n+kB, and knowing n a task remains to identify the specific offset consistent with that hash value. One approach to determining which B wide "bucket" of the original time signal z in which the peak occurs is to perform a full time-based correlation at each of the delays, each requiring $O(N)$ computation, p times. Such an full time correlation approach requires $O(pN)$ operations. As presented below, the step of determining the best bucket may be performed based on probabilistic considerations by an alternative manner in $O(N)$ computation.

The sampled transform values $Z_{pk} = X_{pk} Y_{pk}$ are obtained by computing the sampled values of the transforms of x and y. Note that only every p values of these transforms are required. One way to obtain the p subsampled transform values $X_{pk}$ from x is by direct multiplication of the input values by the appropriate transform multipliers, for example, by $O(N^2/p)$ computations. Another approach is to first compute the time aliased signal $\tilde{x}$ from x, which requires $O(N)$ computations, followed by a transform of the B=N/p length aliased signal, requiring $O((N/p) \log(N/p))$ computation.

Therefore, using the time aliasing of the input signals, reduced length forward and inverse Fast Fourier Transforms, and the location of the "bucket" of the correlation peak, the total computation is $O(pN+(N/p) \log(N/p))$ which is minimized at $p=\sqrt{\log N}$ for a total complexity of $O(N\sqrt{\log N})$.

Referring to FIG. 1, turning now to the specific application in GPS, receiver 110 receives signals from a set of satellites 190 and uses a demodulator 120 to form a baseband signal from the satellite. Each satellite has a storage 192 that holds a pseudorandom code c, which is also known to the receiver 110. The receiver 110 includes a storage for 112 for the code (and optionally precomputed aliased versions of the code). The pseudorandom code c, has ±1 values (referred to as "chips") that repeat every $N_c=1023$ values, referred to below as the code cycle length. In the discussion below, the code c takes the role of x, one of the two input signals introduced above. This code is referred to as the "coarse acquisition (C/A)" code. At the GPS satellite, an "L1" signal is modulated by a product of the code c and a data signal d with ±1 values in which the data signal maintains one value for 20 complete cycles of the pseudorandom code. (For reference, each code cycle takes 1 ms to transmit, so with a propagation speed of $3 \times 10^8$ m/s, each chip time corresponds to approximately 300 m.)

Ignoring the effect of Doppler shift due to the rate of change of range between the satellite and the receiver, and considering a time segment of length N in which the data signal is assumed constant, the received signal y can be considered to be $c^{(t)}$, a delayed version of c by t samples degraded by a white Gaussian noise g. Note that the ±1 pseudorandom values $c_n$ have variance 1; the noise g is assumed to have variance $\sigma^2$.

Note that even performing the full time domain correlation computation for all possible N delays may yield an incorrect estimate of the delay due to the stochastic nature of the signals, with an error probability that depends on (i.e., increases with) the noise variance $\sigma^2$, which characterizes the SNR of the signal. Assuming that the cross-correlation of the pseudo-random signal is zero for non-zero delays, the variance of each value $z_k$ is $N\sigma^2$, with the expected value being N at k=t and zero elsewhere. Therefore, the probability of an error is essentially the probability that at least one of the N-1 incorrect delays having a larger value $z_k$ than the value at the true delay $z_t$.

In the time aliased approach in which the input signal is aliased by a factor of p, given the index n of the peak of the aliased signal $\tilde{z}_n$, one possible source of error is in selection of a bucket k for which the N point time correlation at delay n+kB is greatest. Note that such an error corresponds to one of B−1 delays n+kB having a higher value of the full time-based correlation than that of the true delay. Generally, the probability of each such an error is lower than in the full time-based correlation computation because there are B alternatives as compared to N. On the other hand, because of the time aliasing, the variance of each of value $\tilde{z}_k$ is larger by a factor proportional to p compared to the variance of $z_k$, thereby increasing the probability of each of the B−1 possible errors as compared to each of the N−1 possible errors.

Two approaches may be used each alone, or in combination, to achieve the performance of the estimate of the delay of the full time-based computation while reducing the computation required.

First, in determining which of the B buckets corresponds to the true delay, fewer than N time samples are used in the time-based correlation computation for those delays. For example, rather than N time samples, R=N/r selected samples (e.g., successive samples, or a not necessarily consecutive subset of the N samples) are used. The factor r is referred to as the correlation window factor below. As discussed below, one suitable choice is r=p.

Second, in determining the input signal $\tilde{y}$, rather than determining each sample, with p samples spaced at time-spacing B, pq samples spaced at B are used, which effectively uses an input window of size qN. The factor q is referred to as the input window factor. As discussed below, one suitable choice is q=p. Note that as the input window factor q increases, the error of selecting the correct "bucket" decreases. Note also that use of a window size of qN can be interpreted as subsampling a qN long Discrete Fourier Transform every pq points, and with the aliased output $\tilde{z}$ similarly being a pq aliased version of the correlation function z.

Each combination of aliasing factor (p), correlation window factor (r) and input window factor (q), yields a particular computation requirement. Further combined with the SNR of the input signal (equivalently the variance of the noise), the combination yields an expected error rate, which can be characterized as a multiple of the expected error rate of the conventional FFT-based computation approach.

In some examples, a mapping from SNR to a choice of (p, q, r) is used to select a desired operating point. In some examples, for SNR below a predetermined threshold, the system is configured with p=q=r, and p is in the range 3 to 10. Note that for N=1023, $p=\sqrt{\log_2 N} \approx 3$. In some examples, above that SNR threshold, the system is configured with q=1 and p=r. In other implementations, other choices of the factors may be used, either using a static mapping or using an adaptive approach.

As an example of a parameter selection based on SNR, for SNR in a range −20 dB to −36 dB, p=q=r=10, and N≈4000 are used (i.e., sampling a four times the chip rate). For higher SNR, for example, SNR of −18 dB, p=r=4 and q=1 are used.

These selection of factors can yield lower computation requirements while achieving the same performance (e.g., error rate) of conventional approaches, a result that has been verified in numerical simulations. Furthermore, analytical performance guarantees (asymptotically as N→∞) show that equivalent performance to the conventional FFT-based approach can be achieved at p=q=r for low SNR, and that O(N) computation can be achieved at high SNR.

Returning to a specific implementation for a GPS receiver, note that the code cycle length $N_c$=1023 is not necessarily an integer multiple p of the FFT length B, which is preferably a power of 2. Therefore, circular convolution with a length pB is not exactly suitable to match the cyclic nature of the code signal c, and therefore some zero-padding is useful.

Referring again to FIG. 1, in processing the signal from a representative satellite 190, the receiver 110 uses an signal-to-noise (SNR) estimator 132 to determine the SNR, and a parameter selector 134 to select one or more of the FFT length B, and factors p, q, and r. With reference to elements of FIG. 1, the receiver performs the following operations:

1. Form an input signal $\tilde{y}$ as $$\tilde{y}_n = \sum_{j=0}^{q-1} \sum_{k=0}^{p-1} y_{n+jN_c+kB}$$

for n=0, . . . , B−1 in an alias block 114.

2. Perform the B point FFT of $\tilde{y}$ to yield $\tilde{Y}$ (see blocks 140)

3. Multiple $\tilde{Y}$ by $\tilde{C}$, the computed FFT of the time-aliased code $\tilde{c}$, which may be computed as required or stored precomputed in block 112, as $$\tilde{c}_n = \sum_{k=0}^{p-1} y_{n+kB}$$

for $n = 0, \ldots, B-1$.

4. Perform the B point IFFT of $\tilde{Z}=\tilde{C}\tilde{Y}$. Identify the sample n that maximizes $\tilde{z}_n$ in peak detector 150.

5. For k=0, . . . , p
compute an N/r point time correlation at delay n+kB, for example, as $$z_{n+kB} = \sum_{i=0}^{N/r-1} c_{i-n-kB} y_i$$

and determine the value of k that maximizes the time correlation in a correlation selector 160. The delay estimate is then n+kB. Further data processing of the signal is then performed in block 170 based on the delay (i.e., range) estimate.

Note that the input may be sampled at a rate that is higher than the chip rate, for example with 2 or 4 (or ever a non-integer) multiple of the chip rate. For example, 2048 samples per 1 ms (the code cycle time) may be used.

In some implementations, the magnitude squared of the largest spike of $\tilde{z}$ to the noise variance in the received signal determines the error rate. If the largest spike's squared magnitude exceeds the noise variance by a desired margin, the procedure terminates the search and declares the time shift corresponding to the largest spike as the correct alignment. Otherwise, the algorithm repeats the same process on the subsequent signal samples, and sums the new output with the previous one. Since the spike corresponding to the correct synchronization is at the same time shift in each run, it becomes more prominent. In contrast, noise spikes are random and hence they tend to average out when combining the output of multiple runs of the synchronization algorithm.

In the GPS application, the received signal y arrives at the receiver with a Doppler shift. This shift is modeled as a frequency offset $f_d$ which is a function of the relative speed of the satellite. Furthermore, the discrepancy between the RF oscillators of the GPS satellite and the GPS receiver induces a carrier frequency offset $\Delta f_c$. The total frequency offset $\Delta f = f_d + \Delta f_c$ typically ranges from −10 kHz to 10 kHz and is modeled as a phase shift in the received samples. Formally, if x and $\hat{x}$ are respectively the signal without and with a frequency offset then $\hat{x} = x_t e^{j2\pi \Delta f t}$, where t is time in seconds.

GPS implementations of the above approaches correct for the frequency offset in the received GPS signal in order for the correlation to spike at the correct code shift. However, when pN (or more generally qN, q>1) samples are used, as opposed to N samples in conventional algorithms, the present approach deals with larger phase shifts that accumulate over pN samples. In order to overcome this limitation, a finer grained frequency offset search is performed, which introduces an overhead to the 2D search. This overhead, however, is amortized across all satellites in the GPS signal since correcting for this frequency offset is done on the received signal before it is multiplied by each satellite's C/A code. Despite this overhead, the new approach provides a significant reduction in the computational complexity of GPS synchronization. Furthermore, the frequency offset changes slowly, hence, the receiver can cache its value from recent GPS readings, and does not need to search for it for every GPS synchronization event.

It should be understood that the application to GPS time offset calculation is only one example. Other applications, for example, can be address in similar manner. In addition to one-dimensional (e.g., time, space) signals, multidimensional signals may be addressed in similar ways for example, to identify motion in video frames. One application of motion estimation in video is for compression based on motion prediction on a sub-frame block basis.

The approaches presented above may be implemented in hardware (e.g., using application specific integrated circuits (ASICS)), or in software (e.g., using instructions tangibly stored on computer-readable media for causing a data processing system to perform the steps described above), or in a combination of hardware and software. These implementations may be integrated into a receiver that includes a radio-frequency receiver, for example, for receiving a satellite signal, and may include an output, for example, for providing a location signal derived using the time offsets estimated using the approaches described above.

It is to be understood that the foregoing description is intended to illustrate and not to limit the scope of the invention, which is defined by the scope of the appended claims. Other embodiments are within the scope of the following claims.

What is claimed is:

1. Method for determining a relative offset estimate between a first signal and a second signal comprising:
    acquiring at least one of the first signal and the second signal, including receiving and demodulating a radio positioning system signal to yield the second signal at a receiver;
    for each of the first signal and the second signal, determining a subset of transform coefficients of said signal, including determining an aliased signal from said signal, and performing a forward transform of the aliased signal to yield the subset of transform coefficients;
    combining the subsets of the transform coefficients to determine a subset of transform coefficients of a correlation signal;
    performing an inverse transform of the subset of the transform coefficients of the correlation signal yielding a modified correlation signal;
    determining a set of two or more relative offsets consistent with the modified correlation signal;
    determining the relative offset estimate, including performing a correlation computation using the first and the second signals at multiple relative offsets of the set of two of more relative offsets; and
    using a data signal representing the relative offset estimate in radio positioning of the receiver.

2. The method of claim 1 wherein the first signal comprises a pseudo-random signal known to the receiver, wherein a component of the second signal includes the pseudo-random signal, and wherein the relative offset estimate characterized a time delay of said component of the second signal.

3. The method of claim 1 wherein performing the correlation computation using the first and the second signals comprises using fewer than all signal values of the first signal and of the second signal in the correlation computation.

4. The method of claim 1 wherein
    acquiring the first signal and the second signal includes determining the first signal as an N point pseudo-random signal (c) and receiving and demodulating a radio positioning system signal to yield a qN (product of an input window factor q times N, q≥1) point second signal (y);
    determining the subset of transform coefficients of the second signal includes determining a B<N point aliased input signal ($\tilde{y}$) from the second signal, such that each point of the aliased input signal is based on a number, equal to an aliasing factor p times q, of samples of the second signal (y);
    yielding the modified correlation signal includes yielding a B point aliased correlation signal ($\tilde{z}$); and
    determining the relative offset estimate (n) includes determining a peak of the modified correlation signal ($\tilde{z}$) and performing the correlation computation using the first and the second signals at multiple relative offsets of the set of two of more relative offsets includes for each of the offsets using only R<N samples of each of the first signal and the second signal.

5. The method of claim 4 wherein at least one of parameters q and R are chosen according to a signal-to-noise ratio of the second signal.

6. The method of claim 4 wherein B=N/p, R=N/r, and p is an integer in a range of 3 to 10.

7. The method of claim 1 wherein the receiver comprises a Global Positioning System receiver, and wherein the steps of claim 1 are repeated for each of a plurality of satellite signals in a signal acquisition mode.

8. A method for operating a signal processing device to determine one or more values of a sparse cross-correlation between a first signal and a second signal at a signal processing device, at least one of the first signal and the second signal having been acquired in a signal received at the device as a result of receiving and demodulating a radio positioning system signal, the method comprising:
    determining a subset of transform coefficients of the first signal and the second signal, including determining an aliased signal from said signal, and performing a forward transform of the aliased signal to yield the subset of transform coefficients;
    combining the subsets of transform coefficients;
    determining inverse transform values from the combination of the transform coefficients; and
    using the first signal and the second signal to determine the values of the sparse cross-correlation selected according to the inverse transform values for use in radio positioning of the receiver.

9. The method of claim 8 wherein the subsets of the transform coefficients consist of a regular sub-sampling of transform coefficients of the first signal and of the second signal.

10. A data processing system configured to determine a relative offset estimate between a first signal and a second signal, the second signal being a received and demodulated radio positioning system signal, including
    acquiring at least one of the first signal and the second signal;
    for each of the first signal and the second signal, determining a subset of transform coefficients of said signal, including determining an aliased signal from said signal, and performing a forward transform of the aliased signal to yield the subset of transform coefficients;
    combining the subsets of the transform coefficients to determine a subset of transform coefficients of a correlation signal;
    performing an inverse transform of the subset of the transform coefficients of the correlation signal yielding a modified correlation signal;
    determining a set of two of more relative offsets consistent with the modified correlation signal;
    determining the relative offset estimate, including performing a correlation computation using the first and the second signals at multiple relative offsets of the set of two of more relative offsets; and using a data signal representing the relative offset estimate in radio positioning of a receiver of the radio positioning system signal.

11. The data processing system of claim 10 comprising a processor and a storage for instructions for causing the processor to perform at least one of the functions.

12. Software tangibly stored on a machine-readable medium comprising instructions for causing a processor to perform functions including:
  acquiring at least one of the first signal and the second signal, the second signal being a received and demodulated radio positioning system signal;
  for each of the first signal and the second signal, determining a subset of transform coefficients of said signal, including determining an aliased signal from said signal, and performing a forward transform of the aliased signal to yield the subset of transform coefficients;
  combining the subsets of the transform coefficients to determine a subset of transform coefficients of a correlation signal;
  performing an inverse transform of the subset of the transform coefficients of the correlation signal yielding a modified correlation signal;
  determining a set of two of more relative offsets consistent with the modified correlation signal;
  determining the relative offset estimate, including performing a correlation computation using the first and the second signals at multiple relative offsets of the set of two of more relative offsets; and
  using a data signal representing the relative offset estimate in radio positioning of a receiver of the radio positioning system signal.

* * * * *